Aug. 21, 1934.                J. F. SCHOELLKOPF                1,970,820
                                  SEAT COVER
                              Filed Feb. 2, 1933            2 Sheets-Sheet 1
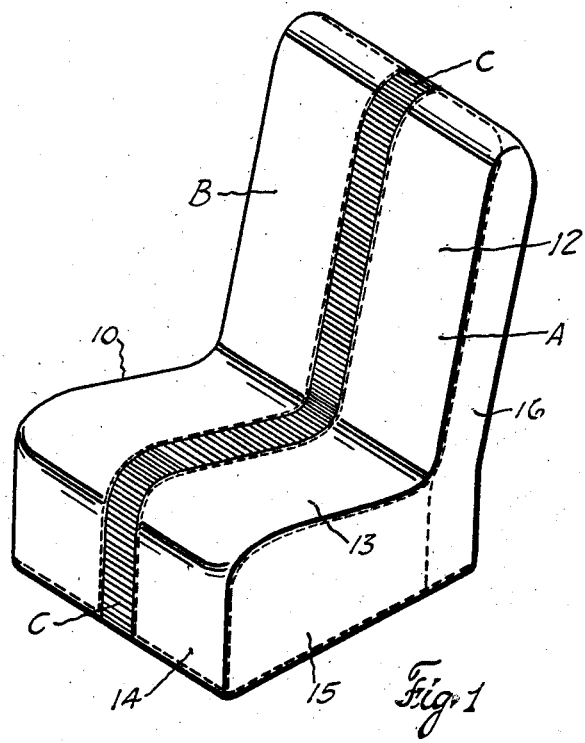
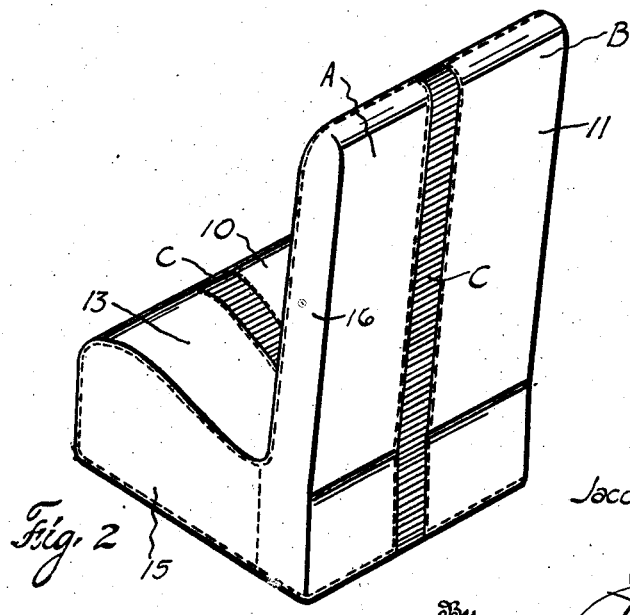
Inventor
Jacob Fred Schoellkopf
By Jack A. Ashley
                Attorney Aug. 21, 1934.   J. F. SCHOELLKOPF   1,970,820
SEAT COVER
Filed Feb. 2, 1933   2 Sheets-Sheet 2

Inventor
Jacob Fred Schoellkopf

By *Jack A. Ochley*
Attorney

Patented Aug. 21, 1934

1,970,820

UNITED STATES PATENT OFFICE 1,970,820

SEAT COVER

Jacob Fred Schoellkopf, Dallas, Tex., assignor to The Schoellkopf Company, Dallas, Tex., a corporation of Texas Application February 2, 1933, Serial No. 654,860

1 Claim. (Cl. 155—182)

This invention relates to new and useful improvements in seat covers.

One object of the invention is to provide an improved slip cover for automobile seats.

A particular object of the invention is to provide an improved cover, wherein continuous upright gussets doubled upon themselves, divide the cover into separate upright sections which are adjustable transversely; whereby the cover becomes self-adjusting in a most efficient manner when applied to seats of different dimensions and contours.

A further object of the invention is to provide a seat cover including a strip of elastic extending continuously from one bottom edge portion upwardly and downwardly to another bottom edge portion, whereby a better fit of the cover may be had on seats of different sizes and contours.

A construction designed to carry out the invention will be hereinafter described together with other features of the invention.

Figure 3:
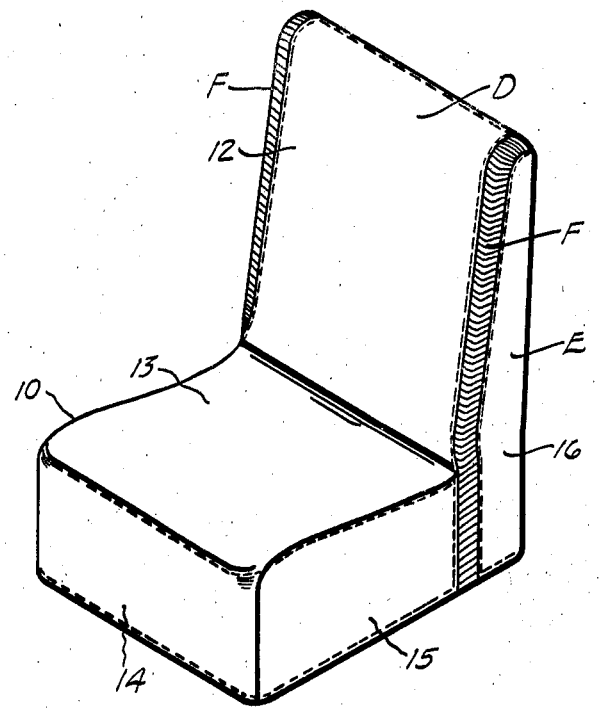
Figure 4:
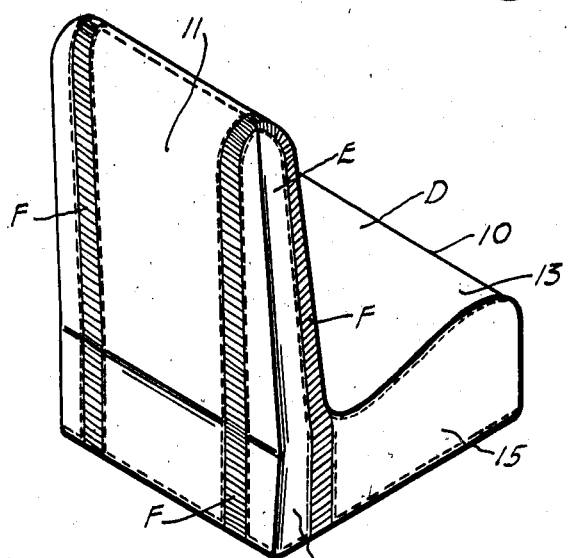

The invention will be more readily understood from a reading of the following specification and by reference of the accompanying drawings in which an example of the invention is shown, and wherein:

Figure 1 is a perspective view of a cover constructed in accordance with the invention and showing the front thereof, Figure 2 is a similar view showing the rear of said cover, Figure 3 is a perspective view of another form of the cover and showing the front thereof, and Figure 4 is a similar view showing the rear of said cover.

In the drawings the numeral 10 designates a seat and back rest cover which is divided into two substantially equal upright sections A and B by a continuous elastic strip C, as is shown in Figures 1 and 2, which sections and elastic strips are adapted to snugly engage the seat and back rest and extend downwardly to the lower edges of the seat cushion. In Figures 3 and 4 the seat cover 10 is divided into three sections, including a central section D and two side sections E, by two continuous elastic strips F.

Referring to Figures 1 and 2, the cover includes a back panel 11, a front panel 12, a seat 13, a front skirt 14, side skirts 15, and side panels 16. These parts may be made of any suitable fabric or material suitable for the purpose, except the strip C, which of course is made of elastic webbing. The fabric may be designated as non-elastic.

The elastic strip C extends from the bottom edge of the skirt 14 upward through the seat 13 and front panel 12. At the top of the cover the strip is turned down or doubled upon itself and extends down to the bottom edge of the back panel 11.

The sections A and B being shaped to the general contour of the automobile seat, it is obvious that the elastic connections will readily permit the cover to yield transversely, whereby the sections will fit smoothly on seats of different widths. However, the sections being connected by a yieldable member will allow each section to yield, whereby the front and back panels are spread to fit the backs of seats of different thicknesses and contours. The seat 13 and the front skirt sections may spread so as to fit different seats. The elastic strip will at all times draw the side skirts 15 and the side panels 16 into intimate contact with the seat, whereby a smooth and snug fitting cover will be provided.

The panels and skirts of the cover may be made in any suitable manner, either of one piece where practical, or in two pieces sewed together. The strip C is sewed along its longitudinal edges to the fabric sections. The particular design or formation of the cover is a matter of considerable variation.

It is not essential to place the strip C in the center of the cover, although this gives a more pleasing appearance. More than one strip may be used as in Figures 3 and 4. Each strip F starts at the bottom edge of one of the side skirts 15 and connects it with the adjacent side panel 16. This strip continues upwardly to the top of the cover, uniting the side panel and the front panel 12. At the top said strip, like the strip C, is doubled upon itself and extends down the back panel 11 to the bottom edge thereof, uniting the back and side panels.

This form has some advantages in that the occupant is not required to sit upon the elastic strip and the cover is more flexible. The elastic strips permit all adjustments hereinbefore enumerated, as well as giving greater adjustability at the sides of the back. It is pointed out that continuous seams or lines of stitches may be run along the edges of the elastic strips in both forms, and this makes for more economical manufacture and smoother fitting.

The description which has been given recites more or less detail of a particular embodiment of the invention, which is set forth as new and useful, however, I desire it understood that the invention is not limited to such exact details of construction, because it is manifest that changes and modifications may be made within the scope of the appended claim without departing from the spirit of the invention.

What I claim and desire to secure by Letters Patent, is:

A slip cover for an automobile seat and back rest consisting of fabric sections adapted to cover the seat and back rest extending upwardly from the plane of the bottom of the seat cushion and substantially following the outer contour of said seat and back rest upwardly to the top of the back rest, and an elastic strip secured between fabric sections of the cover extending continuously from the bottom edge of the cover upwardly in the back of the cover to and over the top of said back rest part and thence downwardly in a part of the cover forwardly of the back part and along a lateral side thereof to the bottom edge of the cover thereby completely separating sections of the cover by the continuous elastic strip as an intermediate connection therebetween so as to afford a double lateral expansible medium, in the rear and forward parts of the cover, for the full height of the slip cover.

JACOB FRED SCHOELLKOPF.